US00RE35602E

United States Patent [19]

Lechner

[11] E Patent Number: Re. 35,602

[45] Reissued Date of Patent: Sep. 9, 1997

[54] PRESSURE-LOADED CYLINDER VALVE INSERT

[75] Inventor: David M. Lechner, Lancaster, N.Y.

[73] Assignee: Harsco Corporation, Wormleysburg, Pa.

[21] Appl. No.: 491,412

[22] Filed: Jun. 16, 1995

Related U.S. Patent Documents

Reissue of:

[64] Patent No.: 5,330,155
Issued: Jul. 19, 1994
Appl. No.: 787,835
Filed: Nov. 5, 1991

[51] Int. Cl.[6] ..... F16L 37/28

[52] U.S. Cl. ..... 251/149.6; 251/368; 137/614.03

[58] Field of Search ..... 251/149.6, 368, 251/149.9, 149.4, 333, 149, 149.1; 137/613, 614.03, 881, 542, 538, 614.2

[56] References Cited

U.S. PATENT DOCUMENTS

| | | | |
|---|---|---|---|
| 2,756,075 | 7/1956 | Rayner, Jr. | 251/149.6 |
| 2,770,474 | 11/1956 | Krapp | 251/149.6 |
| 4,070,003 | 1/1978 | Shames et al. | 251/149.6 |
| 4,476,892 | 10/1984 | Boyce | 251/149.6 X |
| 4,632,146 | 12/1986 | Looney | 137/542 X |
| 4,638,975 | 1/1987 | Iuchi et al. | 251/149.6 |

*Primary Examiner*—Kevin Lee

*Attorney, Agent, or Firm*—Phillips, Lytle, Hitchcock, Blaine & Huber

[57] ABSTRACT

A valve insert (40) is adapted to be removably mounted as a unit on a cylinder valve (41) to selectively enable a flow of fluid therethrough when a male coupling section (52) is inserted into the outlet of the cylinder valve. The improved insert includes a tubular body (55), a valve member (58) mounted for sealed sliding movement relative to the body, biasing means (97) and a docking member (59) mounted on the valve element and adapted to engage the nose of the male section. When the male section engages the insert and displaces a sealing cushion (80) off its seat (72), the pressure of fluid will urge the valve element (58) into tighter sealed engagement with the male section.

17 Claims, 6 Drawing Sheets

PRESSURE-LOADED CYLINDER VALVE INSERT

Matter enclosed in heavy brackets [ ] appears in the original patent but forms no part of this reissue specification; matter printed in italics indicates the additions made by reissue.

TECHNICAL FIELD

The present invention relates generally to the field of LPG cylinder valves and pressure regulators for household and recreational vehicle use, and, more particularly, to an improved insert which is adapted to be mounted within the outlet end of a cylinder valve to facilitate docking of, and sealing with, a separable male fitting.

BACKGROUND ART

Gaseous fuels, such as propane, have found wide acceptance in household and recreational vehicle use. Such fuels are commonly used in association with gas grills, and other similar devices.

Heretofore, a consumer would typically purchase a pressure vessel, commonly known as a "cylinder", containing a certain nominal initial weight of gas. For example, a gas grill will commonly use a 20-pound cylinder. In any event, it is necessary to reduce the pressure of the gas within the cylinder, before delivering a supply thereof to the particular appliance to be fueled. This function has been accomplished by mounting a valve on the cylinder. A pressure regulator is commonly mounted downstream of the valve, and functions to reduce the pressure of gas flowing through the valve.

In recent years, the safety of such devices has been reviewed by various certifying agencies. The stored volume of gas is a fire hazard and, under appropriate conditions, is potentially explosive. To minimize the risk of fire, and because of increasing environmental concerns, it is generally desired to minimize the escape or loss of gas when the appliance is connected and disconnected from the cylinder. This is commonly performed by the homeowner, such as when it is necessary to have his cylinder refilled. In this event, the consumer will typically uncouple the cylinder and valve from the regulator, and take the cylinder to a suitable filling station to be recharged. After this has been accomplished, the consumer will take the cylinder back to the site, and reconnect it to the regulator and appliance.

Accordingly, it would be generally desirable to provide an improvement for a cylinder valve that will insure adequate sealing with a separable male connection inserted therein, and that will minimize the loss or escape of gaseous fuel when the cylinder is disconnected and re-connected to the regulator. At the same time, it would also be desirable to limit an unusually large flow from the cylinder, such as after a gas supply line or conduit has been inadvertently severed.

DISCLOSURE OF THE INVENTION

With parenthetical reference to the corresponding parts, portions or surfaces of the disclosed embodiment for purposes of illustration, but not by way of limitation, the present invention provides a valve insert (e.g., 40) which is adapted to be removably mounted as a unit on or in one fluid conduit (e.g., cylinder valve outlet 48) to selectively enable a flow of fluid (e.g., either a liquid or a gas, typically propane) therethrough when another fluid conduit (e.g., 52) is sufficiently engaged therewith, and to prevent such fluid flow when the conduits are physically separated from one another.

The improved valve insert broadly includes: a tubular body (e.g., 55) adapted to be sealingly mounted on the one fluid conduit (e.g., 48), the body having an opening (e.g., 64) through which fluid may flow, having an annular seat (e.g., 72) surrounding the opening and facing toward the direction of fluid flow, having an abutment surface (e.g., 65) facing away from the direction of fluid flow, and having an inwardly-facing surface (e.g., 69); a valve member (e.g., 58) mounted on the body for movement relative thereto, the valve member having a cushion or seal (e.g., 80) mounted for movement toward and away from the seat to define a variable-area orifice through which fluid may flow, the member being movable relative to the body to any position between a first position (e.g., as shown in FIG. 4) at which the orifice area is a maximum and a second position (e.g., as shown in FIG. 3) at which the orifice area is zero, the member having an abutment surface (e.g., 84) arranged to face the body abutment surface (e.g., 65) and having an outwardly-facing surface (e.g., 85) arranged to slidably engage the body inwardly-facing surface (e.g., 69), the joint between the inwardly-and outwardly-facing surfaces being sealed at all relative positions between the member and body; biasing means (e.g., 97) acting between the body and the member abutment surfaces for continuously urging the cushion to move toward the seat; a docking member (e.g., 59) mounted on the member and adapted to engage the other fluid conduit; and coupling means (e.g., 53,54) for selectively holding the first and second conduits together with the other conduit engaged with the insert; whereby, when the conduit sections are separated, a pressure differential across the insert will act across a first area to urge the cushion into tighter sealed engagement with the seat, and when the other conduit is engaged with the insert and displaces the cushion off the seat, a pressure differential across the insert will act across a second area to urge the docketing member into fluid-tight sealed engagement with the other conduit independent of the specific position of the member relative to the body.

Accordingly, the general object of the present invention is to provide an insert for a cylinder valve, which functions to reduce the leakage or escape of gas when the two coupling sections are joined.

Another object is to provide an insert for a cylinder valve, which functions to reduce leakage when the two coupling sections are physically separated from one another.

Another object is to provide an improved coupling device having separable first and second sections, wherein one of the sections is provided with an insert to prevent fluid flow through the device if the two sections are not operatively connected.

Another object is to provide an improved coupling device having separable male and female sections, wherein one of the sections has an insert operatively arranged to sealingly engage the other of the sections, and wherein the integrity of the fluid-tight sealed engagement is independent of the specific relative position between said members and is independent of the tightening torque applied to a nut, within an operating range of movement.

Still another object is to provide an insert which is adapted to be removably mounted as a unit in a fluid conduit, such as the outlet of a cylinder valve.

These and other objects and advantages will become apparent from the foregoing and ongoing written specification, the drawings and the appended claims.

MODE(S) OF CARRYING OUT THE INVENTION

Figure 1:
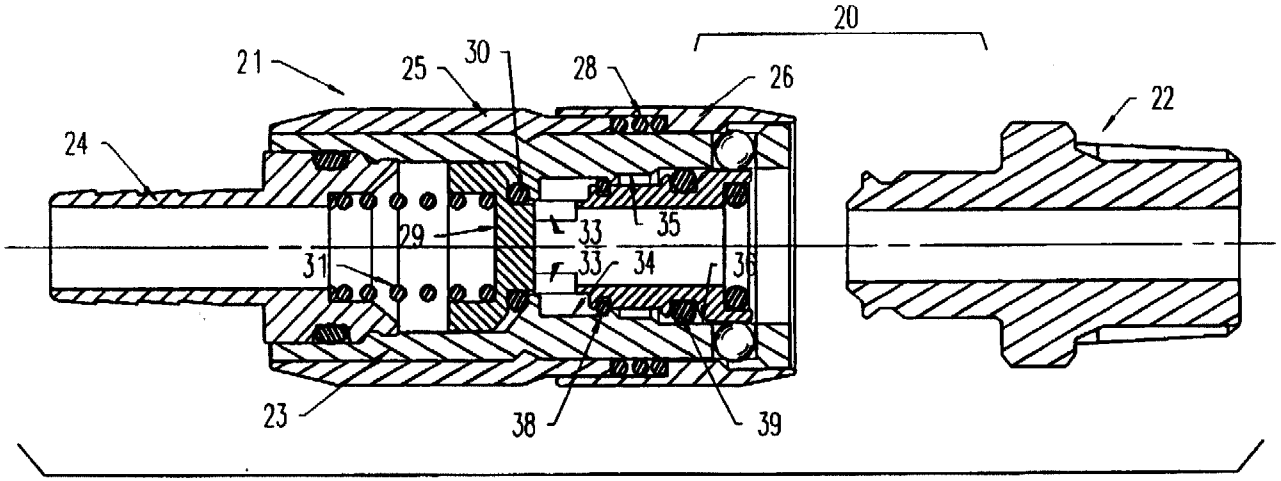
Fig. 1 (PRIOR ART)
FIG. 1 is a fragmentary longitudinal vertical sectional view of a prior art fluid coupling device, such as shown in FIG. 1 of U.S. Pat. No. 4,638,975, showing the separated male and female sections in exploded aligned relation to one another, and showing the female section spring as having displaced the poppet and thrust members rightwardly relative to the body so as to unload and decompress the sealing O-Ring.

At the outset, it should be clearly understood that like reference numerals are intended to identify the same structural elements, portions or surfaces consistently throughout the several drawing figures, as such elements, portions or surfaces may be further described or explained by the entire written specification, or which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and abverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, the present invention provides an improved pressure-loaded cylinder valve insert for ensuring proper sealing of one coupling section with a separable coupling section and for minimizing the escape of gas when such sections are connected or disconnected from one another. The preferred form of the improved insert is shown in FIGS. 3–12. However, before proceeding, it is felt desirable to review the structure and operation of a prior art fluid coupling device.

Figure 2:
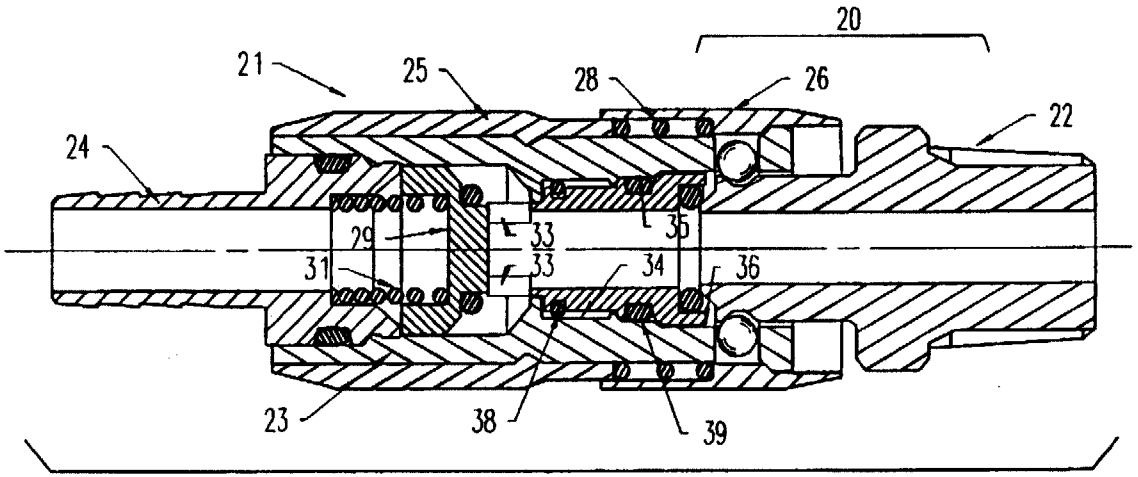
Fig. 2 (PRIOR ART)
FIG. 2 is a fragmentary longitudinal vertical sectional view of the prior art coupling device shown in FIG. 1, but showing the male section as having been inserted into the female section so as to displace the poppet and thrust member leftwardly relative to the body, and further showing the O-Ring as being compressed and loaded to provide a position-dependent seal between the body and thrust member.

Prior Art Fluid Coupling Device (FIGS. 1–2)

A prior art fluid coupling device, such as shown and described in U.S. Pat. No. 4,638,975, is illustrated in FIGS. 1 and 2.

Referring now to FIG. 1, the prior art coupling device, generally indicated at 20 is shown as broadly including a leftward female section 21 and a rightward male section 22. In FIG. 1, these two sections are shown as being physically separated from one another.

As best shown in FIG. 1 the female section 21 is shown as having a horizontally-elongated specially-configured tubular body 23. A leftward stepped tubular end fitting 24 is sealingly mounted in the left marginal end portion of body 23. A tubular sleeve 25 surrounds the left marginal end portion of body 23. A quick-disconnect slidable cover 26 is mounted on right marginal end portion of body 23 for axial sliding movement relative thereto. Cover 26 is biased to move rightwardly relative to the body by a spring 28. A cup-shaped valve member, generally indicated at 29, carrying an annular O-Ring 30, is mounted within body 23 for axial sliding movement toward and away from an inwardly-extending annular flange. Valve member 29 is biased to move rightwardly toward the flange by means of a coil spring 31 acting between left end fitting 24 and valve member 29.

A horizontally-elongated tubular thrust member 32 is mounted in the right marginal end portion of body 23 for axial sliding movement relative thereto. The left end of thrust member 32 abuts the circular vertical right end face of valve member 29. Thrust member 32 has an internal through-bore, and a plurality of openings, severally indicated at 33, communicate its inner and outer surfaces just right of its left end face.

As best shown in FIG. 1, the right marginal end portion of the body bore includes, in pertinent part, a plurality of sequential inwardly-facing horizontal cylindrical surfaces, indicated at 34, 35 and 36, respectively. The thrust member carries two axially-spaced O-Rings 38, 39, respectively. The left O-Ring 38 engages body bore surface 34 at all operative positions of the valve and thrust members relative to the body. While O-Ring 38 is resilient, it is not seated in the annular groove provided in the thrust member. Moreover, O-Ring 38 is arranged to engage an inwardly-extending annular boss, as shown in FIG. 1, ostensibly to prevent unintended separation of the thrust member from the body.

Thus, when the thrust member is inserted axially into the body, O-Ring 38 will deform about the contour of this annular boss to permit the thrust member to be snapped into the position shown in FIGS. 1 and 2.

According to U.S. Pat. No. 4,638,975, sealing is provided by means of right O-Ring 39. When the male member 22 is physically separated from the female member 21, as shown in FIG. 1, spring 31 will expand to urge valve member 29 and cushion 30 into fluid-tight sealed engagement with the body flange. Since the left end face of the thrust member abuts the right end face of the valve member, the thrust member will be in the position shown in FIG. 1 when the two coupling sections are separated. Body surface 36 is of greater diameter than body surface 35. Hence, O-Ring 39 is unloaded when the thrust member is in the position shown in FIG. 1. Indeed, the '975 patent specifically states at col. 4, line 7 et seq.:

> "The second sealing ring is arranged such that it is located in the larger diameter section, while the valve is kept close[d], to be free from being compressed thereby and that it passes through [the] cam surface into the reduced diameter section, when the valve is caused to open, to be compressed into sealing contact therewith, whereby the sealing between the tubular member and the main body is tightened only while the male coupling member is connected to the female coupling member and is kept loosened while the male coupling member is released, which serves to mitigate the fatigue of the sealing ring[,] commonly made of artificial rubber and the like elastic materials. Therefore, there is assured secure sealing, as well as an extended sealing life."

FIG. 2 discloses illustrates an alternative position of O-Ring 39 when the male section is brought into objective coupled engaged with the female section. It will be noted that the leftward end face of the male section displaces the valve and thrust members leftwardly relative to the body. When this occurs, O-Ring 39, which was initially radially aligned with body surface 36 when the coupling sections were separated, moves along the rightwardly- and inwardly-facing frusto-conical cam surface, and engages reduced-diameter body surface 35 to compressively load the same, when the coupling sections are joined together.

Thus, the '975 patent discloses a type of fluid coupling section wherein a thrust member, movable with a valve member, carries a sealing O-Ring. However, the compression, and hence sealing effectiveness, of that O-Ring is dependent upon the position of the thrust member relative to the body. In other words, when the male section first docks with the thrust member, and displaces the valve member slightly off the cushion, O-Ring 39 will still engage the relatively large diameter body surface 36, and will not be compressed into fluid-tight sealing engagement with the body. Thus, fluid passing through end fitting 24 may leak past O-Ring 39 until such time as the thrust member is displaced further leftwardly such that O-Ring 39 compressively engages body surface 35.

The Improved Insert (FIGS 3–10)

The present invention provides an improved valve insert having a valve member mounted for sliding movement relative to a body, but one in which the valve member is pressure-loaded into fluid-tight sealing sealed engagement with the male section at all permissible positions of the valve member relative to the body.

Figure 3:
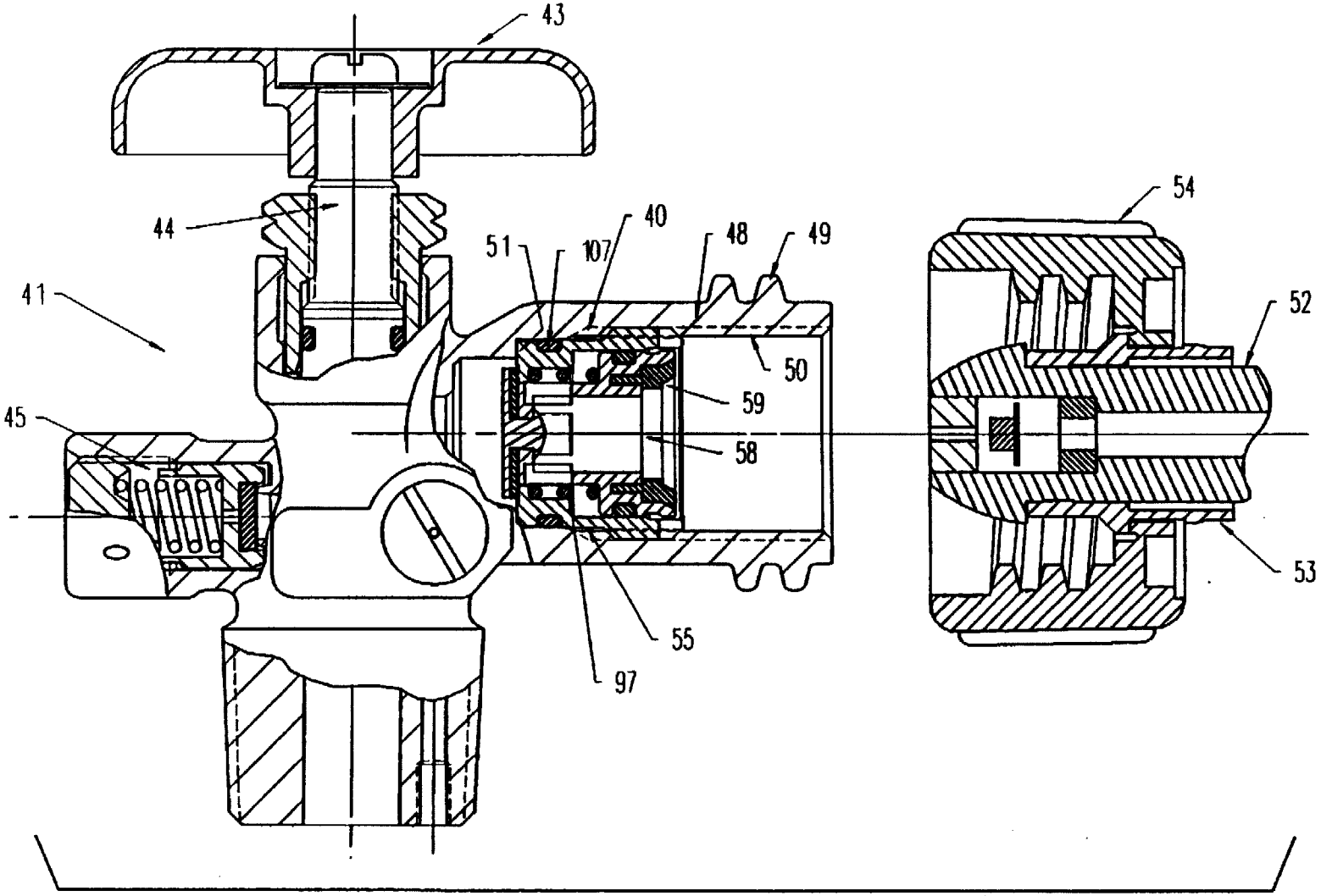
FIG. 3 is a fragmentary longitudinal vertical view, partly in elevation and partly in section, of the improved insert mounted on a cylinder valve, this view showing the male section and a thermally-sensitive coupling nut thereabout in exploded aligned relation to the cylinder valve outlet.
Figure 4:
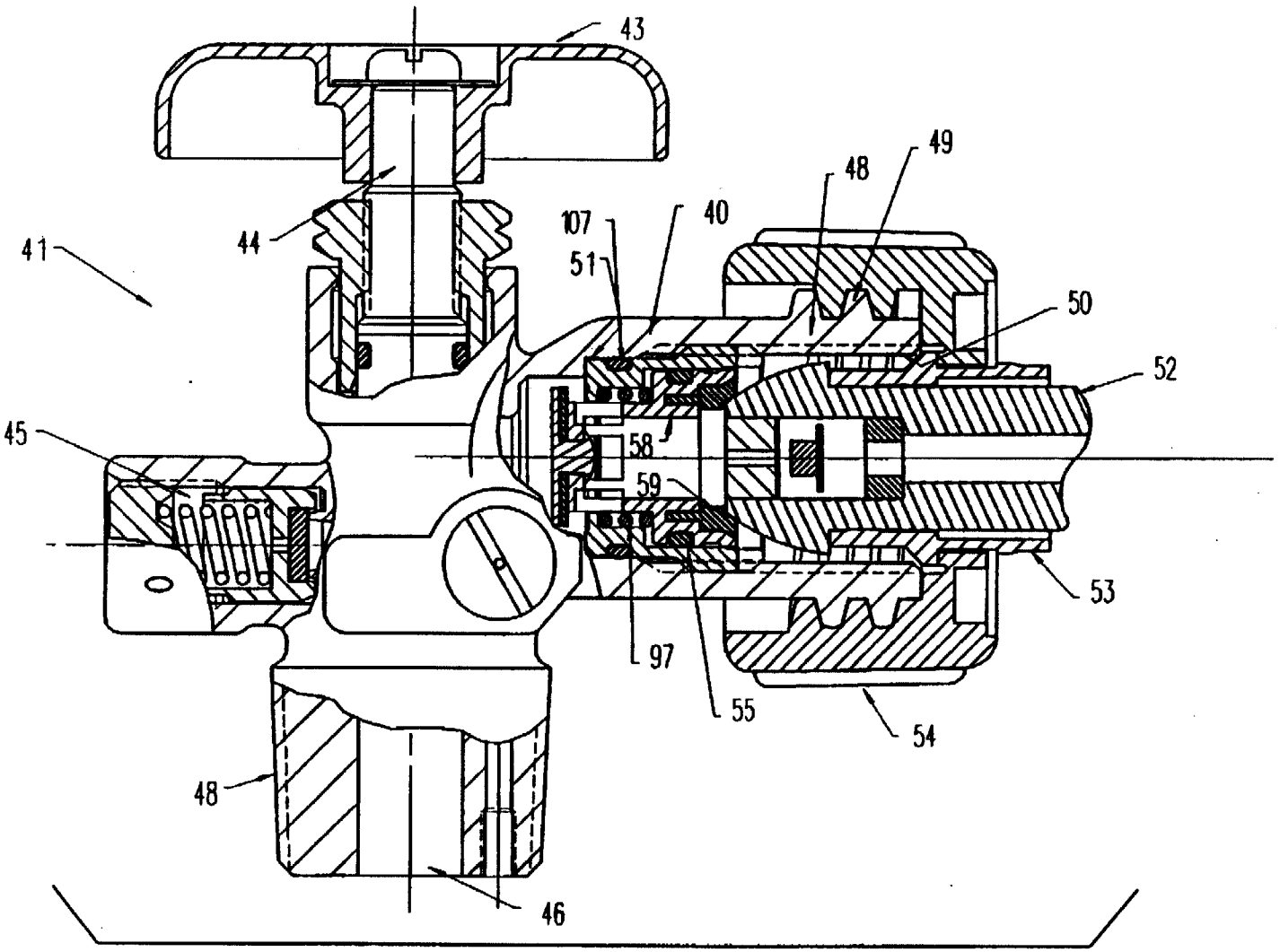
FIG. 4 is a fragmentary longitudinal vertical sectional view of the improved insert shown in FIG. 3, but showing the male section as having been inserted into the cylinder valve outlet to partially open the insert valve assembly, with the coupling not operatively engaging the threads on the cylinder valve outlet.

Referring now to FIGS. 3 and 4, the improved insert, generally indicated at 40, is depicted as being mounted on a cylinder valve, generally indicated at 41.

Cylinder valve 41 is functionally "old". As shown, the cylinder valve was a specially-configured cast-and-machined body. A lower threaded marginal end portion 42 of the body is adapted to be threaded into sealed engagement with a suitable gas storage cylinder (not shown). An uppermost rotatable hand wheel 43 is connected to a stem 44 for moving a valve element (not shown) relative to a seat to selectively permit flow through the valve. In FIGS. 3 and 4 the cylinder valve is shown as further having a pressure relief valve, generally indicated at 45, to automatically relieve an excess pressure condition in the cylinder. The cylinder valve has an internal inverted L-shaped passageway having a lowermost inlet end 46 and a horizontally-elongated rightwardly-extending tubular outlet, generally indicated at 48. This outlet is provided with an external screw thread 49. The outlet is shown as being internally threaded, as indicated at 50, and has a rightwardly-facing annular vertical abutment surface 51.

At best shown in FIG. 3, the male section has a standard POL nipple, generally indicated at 52. A sleeve 53 surrounds the nipple, and is itself surrounded by a thermally-sensitive coupling nut 54. These several elements of the male section will be described in greater detail infra. Hence, a detailed description of the structure of these elements will be deferred for the moment.

As shown in FIGS. 3 and 4, the insert broadly includes a body 55, a backing member 56, a valve element 58, and a docking member 59. The structure of these four elements is best shown in FIG. 5–10.

Figures 5, 6, 7, 8, 9, 10:
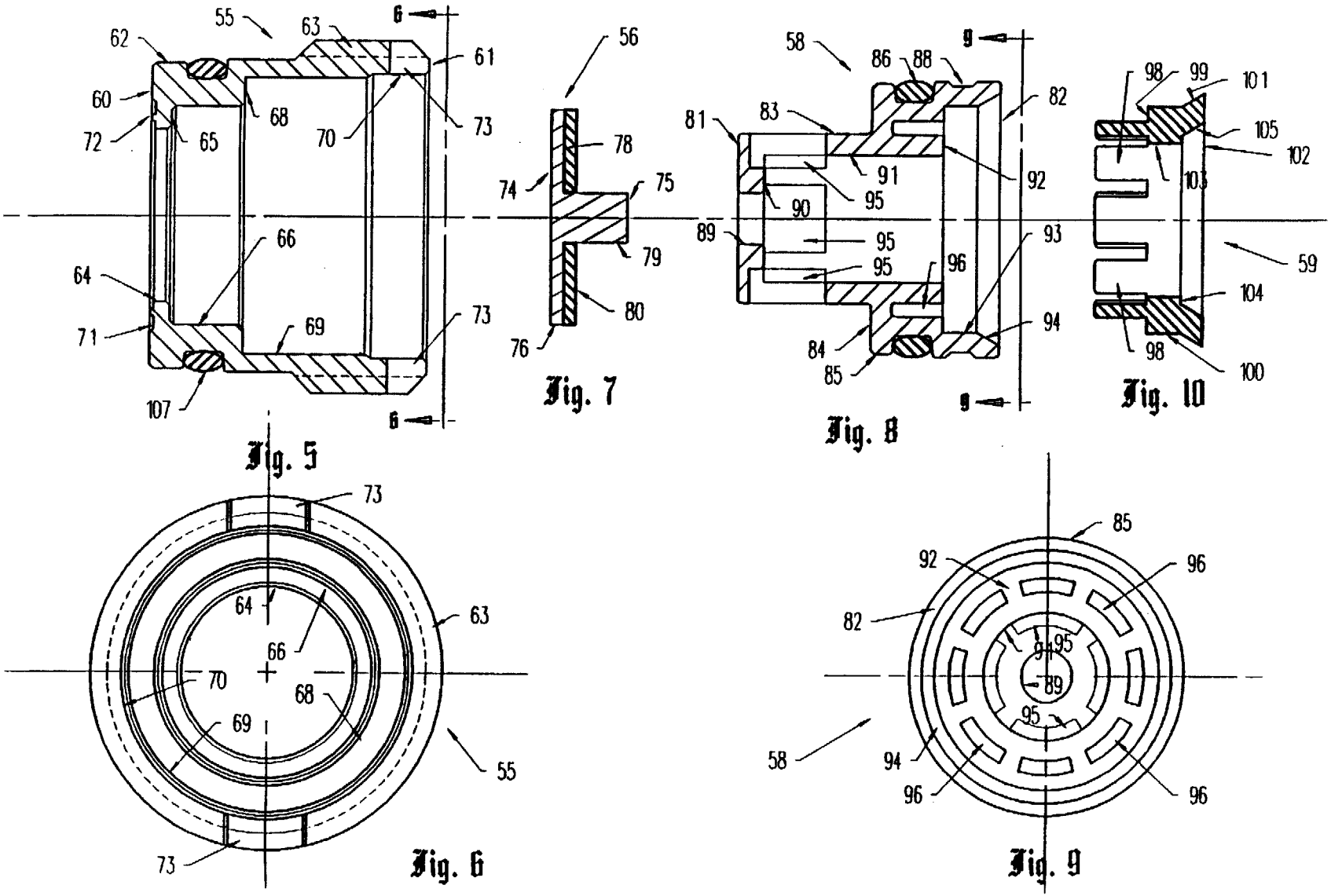
FIG. 5 is an enlarged fragmentary longitudinal vertical sectional view of the insert body shown in FIGS. 3 and 4.
FIG. 6 is a fragmentary transverse view thereof, taken generally on line 6—6 of FIG. 5, showing the right end of the insert body in elevation.
FIG. 7 is an enlarged fragmentary longitudinal vertical sectional view of the cushion and backing plate shown in FIG. 1, this view depicting the stub shaft of the backing plate prior to being peened into engagement with the valve element.
FIG. 8 is an enlarged fragmentary vertical sectional view of the insert valve element shown in FIGS. 3 and 4.
FIG. 9 is fragmentary transverse view thereof, taken generally on line 9—9 of FIG. 8, showing the right end of the insert valve element in elevation.
FIG. 10 is an enlarged fragmentary vertical sectional view of the docking member shown in FIG. 3 and 5.

Referring now in FIG. 5, insert body 55 is shown as being a horizontally-elongated stepped tubular member having an annular vertical left end face 60, and an annular vertical right end face 61. The body has an outer surface which sequentially includes, in pertinent part, a cylindrical surface 62 extending rightwardly from the outer margin of left end face 60, and an externally-threaded portion 63 of enlarged diameter continuing rightwardly therefrom to join the outer margin of right end face 61. The insert body also has a stepped axial through-bore, which sequentially includes: a horizontal cylindrical surface 64 extending rightwardly from the inner margin of left end face 60, a rightwardly-facing annular vertical surface 65, a horizontal cylindrical surface 66, a rightwardly-facing annular vertical surface 68, a horizontal cylindrical surface 69, and a horizontal cylindrical surface 70 of enlarged diameter continuing rightwardly therefrom to join the inner margin of right end face 61. A shallow annular recess is shown as extending rightwardly into the body from its left end face 60 so as to surround horizontal cylindrical surface 64. This recess includes a leftwardly-facing annular vertical surface 71 from which a rounded annular lug 72 extends leftwardly so as to be substantially coplanar with left end face 60. As best shown in FIG. 6, a pair of diametrically-opposite slots, severally indicated at 73, extend radially outwardly from inner surface 70 to the outer surface of threaded portion 63. Body 55 may be formed of brass or some other suitable metal. Alternatively, the body may be formed of a suitable plastic such as polyethylene terephalate, or equivalent.

Referring now to FIG. 7, the backing plate assembly 56 is shown as including a disk-like backing plate provided with a rightwardly-extending axial stub. More particularly, the backing plate is shown as initially having a leftwardly-facing circular vertical surface 74, a rightwardly-facing circular vertical surface 75, and an outer surface which sequentially includes a horizontal cylindrical surface 76, a rightwardly-facing annular vertical surface 78, and a horizontal cylindrical surface 79 continuing rightwardly therefrom to join the outer margin of right end face 75. This backing plate may also be formed of brass, or some suitable plastic material, as desired. The resilient cushion or seal, generally indicated at 80, is shown as somewhat resembling a flat washer, and is penetrated by the stud of the backing plate. More particularly, the annular vertical left end face of cushion 80 abuts backing member annular vertical surface 78. The cushion may be formed of nitrile (buna N) rubber, and is available from Rubber Craft Corp. of California as Compound No. 2090. This particular type of rubber has a hardness of about 90±5 durometer on a Shore "A" scale.

Referring now to FIG. 8, valve element 58 is shown as being a horizontally-elongated specially-configured tubular member. More particularly, the valve element has an annular vertical left end face 81 and an annular vertical right end face 82. The outer surface of the valve element sequentially includes: a horizontal cylindrical surface 83 extending rightwardly from the outer margin of left end face 81, a leftwardly-facing annular vertical surface 84, and a horizontal cylindrical surface 85 continuing rightwardly therefrom to join the outer margin of right end face 82. An annular recess extends radially into the valve element from outer surface 85 to receive and accommodate an O-Ring 86. Another shallow groove, indicated at 88, extends into the valve element from outer surface 85 between O-Ring 86 and right end face 82. The valve element is further provided with a stepped axial through-bore, which sequentially includes: a horizontal cylindrical surface 89 extending rightwardly from the inner margin of left end face 81, a rightwardly-facing annular vertical surface 90, a horizontal cylindrical surface 91, a rightwardly-facing annular vertical surface 92, a horizontal cylindrical surface 93, and a rightwardly- and inwardly-facing frusto-conical surface 94 continuing rightwardly there-from to join the inner margin of right end face 82. Four circumferentially-spaced through-slots, severally indicated at 95, communicate inner surface 91 with outer surface 83. A plurality of cylindrically-segmented blind slots, severally indicated at 96, extend leftwardly into the valve element from surface 92. As best shown in FIG. 9, these segmented slots are arranged in a bolt circle, and are spaced equidistantly from one another. In the disclosed embodiment, there are eight such slots, although a greater or lesser number could alternatively be employed. Indeed, these several slots could be joined such that a single annular recess would extend into the valve element from surface 92, if desired. The valve element may be formed of brass, polyethylene terephalate, or some other suitable material.

Referring now to FIG. 10, docking member 59 is shown as being a horizontally-elongated specially-configured member having a plurality of leftwardly-extending circumferentially-spaced circularly-segmented fingers, severally indicated at 98, adapted to be received in valve member slots 96. The docking member has a leftwardly-facing annular vertical surface 99 from which fingers 98 extend, a horizontal cylindrical surface 100, and a leftwardly- and outwardly-facing frusto-conical surface 101 continuing rightwardly therefrom to join the outer margin of an annular vertical right end face 102. The docking member has an axial through-bore, which is bounded in pertinent part by a horizontal cylindrical surface 103 extending rightwardly from surface 99, a rightwardly-facing annular vertical surface 104, and a rightwardly- and inwardly-facing frusto-conical surface 105 continuing rightwardly therefrom to join the inner margin of right end face 102. The docking member may be molded of a suitable nitrile rubber in situ with the valve element slots. In the preferred embodiment, docking member has a hardness of about 70±5 on a Shore "A" scale.

The improved insert is assembled as shown in FIGS. 3 and 4. More particularly, docking member 59 is molded in situ with valve element 58. Alternatively, the docking member may be formed as a physically-separated element, and be subsequently assembled with the valve element. In any event, the valve element and docking member subassembly is then mounted on the insert body, with the left marginal end portion of the valve element penetrating body hole 64. Once so positioned, the backing plate and cushion are then mounted on the valve element. More particularly, the right marginal end portion of the backing member stub shaft is passed through valve element hole 89, and the distal end thereof is peened to form a rivet-like head, as shown in FIGS. 3 and 4, to prevent unintended separation of the backing plate element from the valve element. As shown in FIGS. 3 and 4, the cushion and flange of the backing plate element is of greater diameter than hole 64. Thus, valve element 58 may not be withdrawn from body 55.

The improved insert 40 is insertable into and removable from, the cylinder valve outlet as a unit. As best shown in FIGS. 3 and 4, the insert may be threaded into the outlet of the cylinder valve, with insert body threaded portion 63 engaging cylinder valve outlet threaded portion 50. Indeed, as shown, the insert may be threaded into the outlet until such time as body left face 60 abuts cylinder valve surface 51. O-Ring 107 seals the joint between insert body surface 62 and the inwardly-facing surface of the cylinder valve outlet.

The valve element is mounted on the insert body for horizontal sliding movement relative thereto, as comparatively shown in FIGS. 3 and 4. When the male section is physically separated from the insert, spring 97 will expand to urge the valve element to move rightwardly relative to the insert body. This causes resilient cushion 80 to sealingly engage seat 72 in fluid-tight engagement therewith. Alternatively, as shown in FIG. 4, when the male section is inserted into the cylinder valve outlet, docking member surface 105 first engages the convex nose of the male section nipple. When the male section is inserted further leftwardly into the female section outlet, the valve element 58 will move leftwardly relative to body 55, and cushion or seal 80 will be displaced leftwardly off seat 72. The position of the valve element relative to the body shown in FIG. 3 represents a first extreme relative position between the valve element and insert body, at which position the orifice area has been reduced to zero to prevent flow through the insert. The position shown in FIG. 4 represents a second intermediate position of the valve element relative to the body, in which the orifice area defined by now-uncovered slots 95 through which fluid may flow, are approximately one-half of their maximum values.

Figure 11:
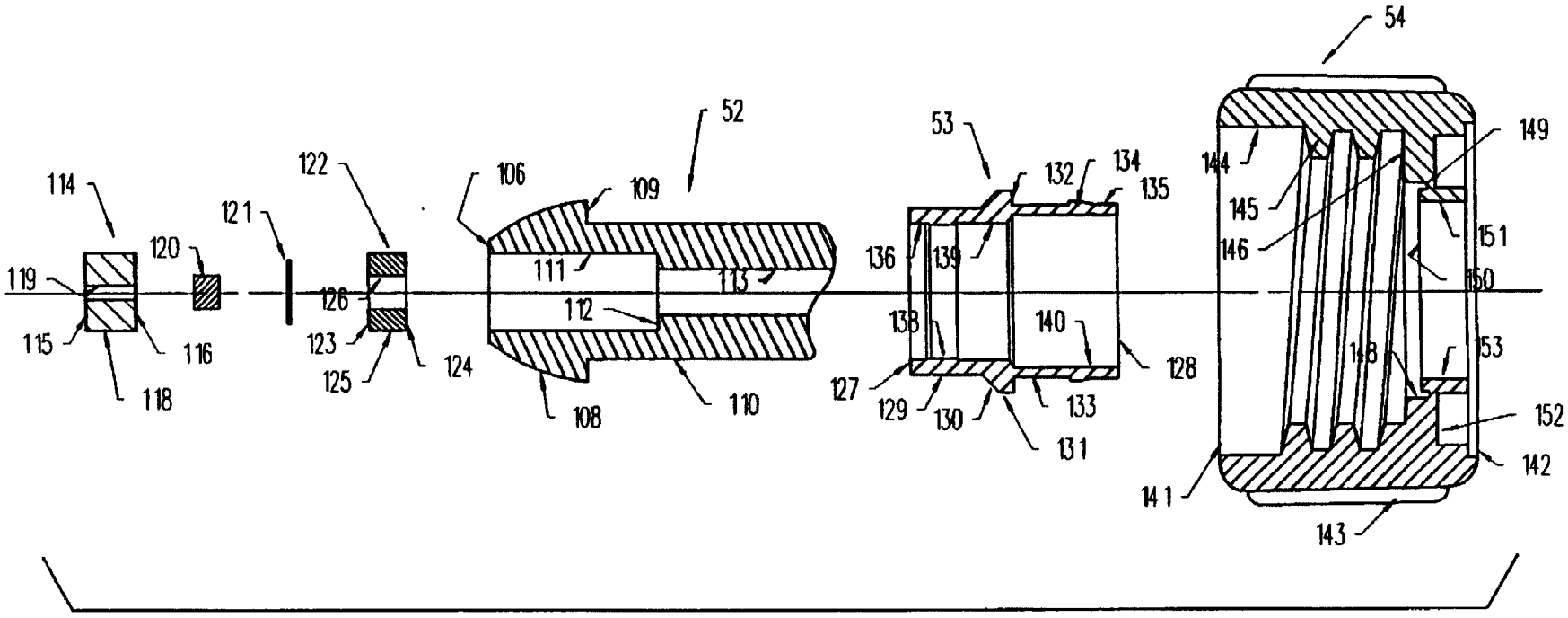
FIG. 11 is an enlarged fragmentary vertical sectional view of the male section and coupling nut, this view showing the flow-limiting orifice, the male fitting and the thermally-sensitive coupling nut in exploded aligned relation to one another.

Referring now to FIG. 11, the male section nipple is shown as being horizontally elongated, and has an annular vertical left end face 106, a convex annular surface 108, a rightwardly-facing annular vertical surface 109, and a horizontal cylindrical surface 110 continuing rightwardly therefrom. The nipple has a stepped axial through-bore, which includes a horizontal cylindrical surface 111 extending rightwardly from the inner margin of left end face 106, a leftwardly-facing annular vertical surface 112, and a horizontal cylindrical surface 113 continuing rightwardly therefrom. A plug-like flow restrictor, generally indicated at 114, is adapted to be press-fitted into the open mouth of the nipple passageway, as shown in FIGS. 3 and 4. As best shown in FIG. 11, this flow restrictor is a horizontally-thickened vertically-disposed washer-like member having annular vertical left and right end faces 115, 116, respectively, an outer cylindrical surface 118, and an axial through-bore bounded by inner cylindrical surface 119. A magnet, generally indicated at 120, is adapted to be suitably positioned within the enlarged diameter portion of the male section through-bore, and is suitably secured to the male section nipple. A circular disk-like ferrous plate, 121, is adapted to be loosely and movably positioned between magnet 120 and an annular seat member 122. This latter element is shown as having annular vertical left and right end faces 123, 124, respectively, a cylindrical outer surface 125, and a cylindrical inner surface 126. Thus, ferrous plate 121 will normally be held tightly against magnet 120 as shown in FIGS. 3 and 4. However, if the flow through the male section exceeds a predetermined limit, the force of such flow will displace the plate away from the magnet to cover opening 126, thereby preventing further flow through the valve. The plate will be held in this position until such time as the flow drops below the predetermined minimum, after which the plate will automatically move leftwardly into attracted engagement with the magnet.

Still referring to FIG. 11, the sleeve 53 is shown as being a horizontally-elongated specially-configured tubular member having an annular vertical left end face 127, an annular vertical right end face 128, and a stepped outer surface which sequentially includes a horizontal cylindrical surface 129 extending rightwardly from the outer margin of left end face 127, a leftwardly- and outwardly-facing frusto-conical surface 130, a horizontal cylindrical surface 131, a rightwardly-facing annular vertical surface 132, a horizontal cylindrical surface 133, an annular raised boss 134, and a horizontal cylindrical surface 135 continuing rightwardly therefrom to join the outer margin of right end face 128. Sleeve 53 is also shown as having a stepped axial through-bore, which sequentially includes: a horizontal cylindrical surface 136 extending rightwardly from the inner margin of left end face 127, an inwardly-extending annular boss 138, a horizontal cylindrical surface 139, and a horizontal cylindrical surface 140 of enlarged diameter continuing rightwardly therefrom to join the inner margin of right end face 128. Sleeve 53 is positioned over the male section nipple, as shown in FIGS. 3 and 4, with inwardly-extending annular boss 138 frictionally engaging nipple outer surface 110.

Coupling nut 54 is of the type generally disclosed in U.S. Pat. No. 4,911,194, which is assigned to the assignee of the present invention. This coupling nut is shown as having an annular vertical left end face 141, an annular vertical right end face 142, and an outer knurled surface 143 extending therebetween. The coupling nut further includes a horizontal cylindrical surface 144 extending rightwardly from the inner margin of left end face 144, a plurality of screw threads 145, a leftwardly-facing annular vertical surface 146, a horizontal cylindrical surface 148, a concave annular recess 149, a leftwardly-facing annular vertical surface 150, and a horizontal cylindrical surface 151. An annular recess 152 extends leftwardly into the coupling nut from right end face 142. More particularly, this recess is shown as extending leftwardly into the coupling nut from right end face 142 to define an annular weakened portion 153. The coupling nut may be formed of a suitable 20% glass-filled flame-retardant polyproplyene, or some other material mentioned in U.S. Pat. No. 4,911,194, the aggregate disclosure of which is hereby incorporated by reference.

The orifice, magnet, plate and seat member are mounted in the enlarged-diameter mouth of male section nipple 52. Sleeve 53 is positioned on the nipple, with its the annular vertical left end face abutting nipple surface 109. Coupling nut 54 is also positioned over the male section nipple.

Adverting now to FIG. 3, when the male and female coupling sections are physically separated from one another, spring 97 expands to urge the backing member cushion 80 into fluid-tight sealed engagement with the insert body seat. Any pressure differential across the insert will act across a first net area to urge the cushion into tighter sealed engagement with the seat.

When the male section is to be joined to the female section, the nose of the male section is first inserted to engage the insert docking member cushion. Thereafter, continued insertion (i.e., leftward movement of the male section relative to the female section) will displace the valve element 58 relative to insert body 55, causing cushion 80 to move off its seat. When this occurs, the pressure of fluid in the cylinder (not shown) may pass through the passageway of the cylinder valve, and will act on the valve element thereby urging it into tighter sealed engagement with the nose of the male section member. Moreover, the extent of each pressure loading is not dependent upon the specific position of the valve element relative to the insert body. Rather, so long as cushion 80 is displaced off seat 72, such pressure will be effective to bias the valve element into fluid-tight sealed engagement with the male section nipple. Thus, this pressure-loading feature ensures a fluid-tight seal at all times when the cushion is displaced off the seat, and independently of the specific position of the valve element relative to the body. Thus, so long as the cushion is displaced off its seat, the integrity of the fluid-biased seal will be independent of the amount of tightening torque exerted on nut 54.

Figure 12:
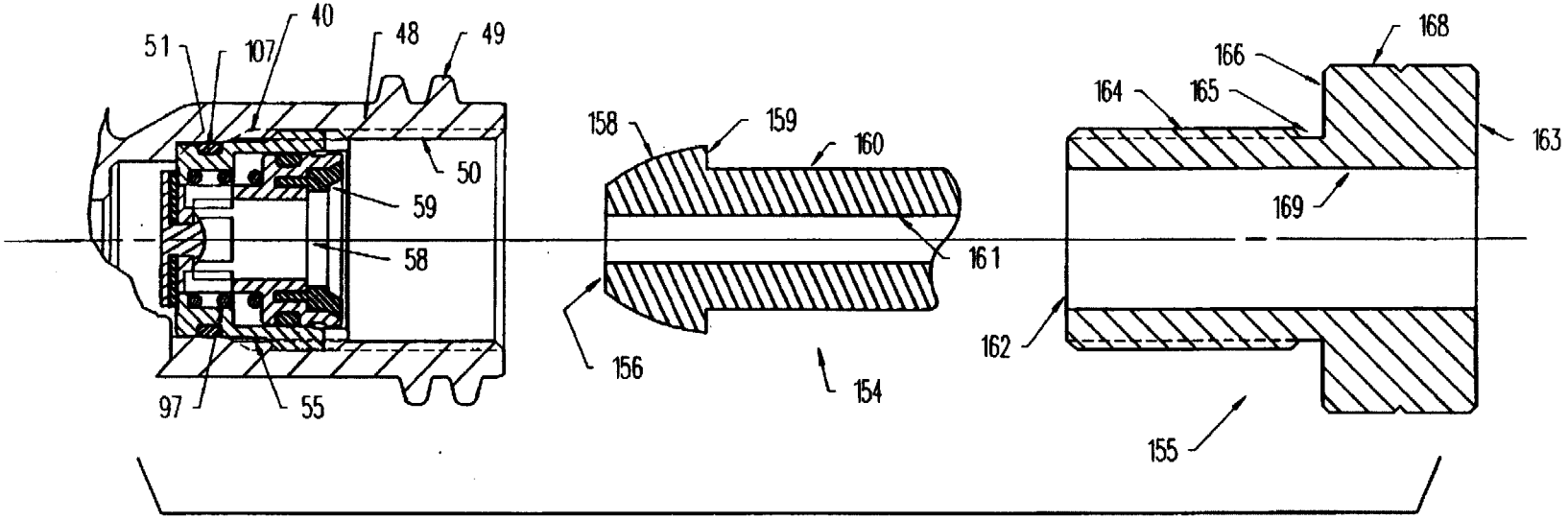
FIG. 12 is a fragmentary vertical sectional view of the insert mounted in the outlet end of the cylinder valve, and showing an alternative male section nipple in exploded aligned relation thereto.
Figure 13:
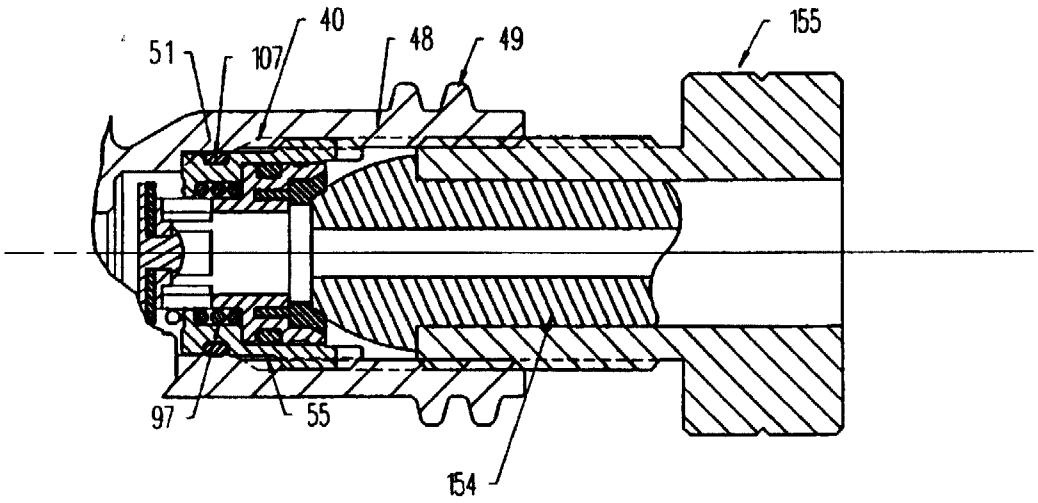
FIG. 13 is a fragmentary vertical sectional view thereof, generally similar to FIG. 12, but showing the alternative nipple as having been inserted into the outlet and as displacing the insert valve element to its fully-opened position.

FIGS. 12 and 13 depict an alternative form of the male section nipple and an alternative means of attaching such nipple to the cylinder valve.

FIG. 12 depicts the alternative nipple, generally indicated at 154, and a nut, generally indicated at 155, in exploded aligned relation to cylinder valve 41 and insert 40. Since the nipple and nut are physically separated from the cylinder valve in FIG. 12, spring 97 has expanded to hold cushion 80 in fluid-tight sealed engagement with seat 72. Thus, in FIG. 12, the insert is shown as being in the same position as depicted in FIG. 3.

The alternative nipple 154 is again shown as being a horizontally-elongated tubular member having an annular vertical left end face 156, a convey annular surface 158 extending rightwardly from the outer margin of end face 156, a rightwardly-facing annular vertical surface 159, and a horizontal cylindrical surface 160 extending rightwardly thereof. The nipple is also provided with an axial through-bore bounded by cylindrical surface 161. Thus, alternative nipple 154 omits the flow restrictor, magnet and ferrous plate associated with nipple 54.

The alternative nut 155 is depicted as being a horizontally-elongated specially-configured member having an annular vertical left end face 162, an annular vertical right end face 163, and a stepped outer surface which sequentially includes an externally-threaded portion 164 extending rightwardly from the outer margin of left end face 162, a horizontal cylindrical surface 165 of reduced diameter, a leftwardly-facing annular vertical surface 166, and a polygonal surface 168, continuing rightwardly therefrom to join the outer margin of right end face 163. Surface 168 is adapted to be selectively engaged by a suitable turning tool (not shown), by means of which the nut may selectively be threaded into, or out of engagement, with cylinder valve outlet threads 50. The nut is also shown as having an axial through-bore bounded by horizontal cylindrical surface 169 which is arranged to rotatably encircle nipple outer surface 160.

As shown in FIG. 13, nut 155 is first slipped over the nipple surface 160, and is slidably moved therealong such that nut left end face 162 engages facing nipple annular surface 159. Thereafter, the nipple is inserted into the cylinder valve outlet such that portion of nipple surfaces 156,158 engage docking member surfaces 104,105. Nut threaded portion 164 matingly engages cylinder valve outlet threaded portion 50, and the nut is then rotated to displace nipple 154 leftwardly. Such motion of the nipple moves insert valve element 58 leftwardly, thereby displacing cushion 80 off seat 72 and allowing the pressure differentiated to urge docking member into fluid-tight sealed engagement with the leftward nose of the nipple. Unlike the embodiment shown in FIG. 3, which displaced the insert valve element to a half-open position when nut 54 was rotated to a snug or tight position relative to the cylinder valve, alternative nut 155 is so configured dimensioned and arranged as to displace insert valve element 58 to its fully-opened position, as shown in FIG. 13, when the nut is threaded into the outlet. Otherwise stated, slots 95 are uncovered to about one-half of their maximum extent in FIG. 3, but are uncovered to their maximum extent (i.e., as determined by valve element surface 81 engaging cylinder surface 51) in FIG. 13. Thus, the position shown in FIG. 13 represents a third relative position between the valve element and the body. If desired, alternative nut 155 and/or alternative nipple 154 could be designed and configured so as to vary this extent of valve opening.

The alternative male section shown in FIGS. 12 and 13 might, for example, be associated with a suitable source (not shown) of pressurized gas, and used to recharge the cylinder (not shown) through the cylinder valve outlet. During such a refilling operation, it would be desirable that the uncovered orifices defined by uncovered slots 95 be as large as possible so as to minimize the pressure drop therecross, and, hence, the time needed to refill the cylinder. At the same time, the fact that partially-uncovered slots are only half-opened when nut 54 and nipple 52 are mounted on the cylinder valve is not disadvantageous since the pressure of the outlet flow must normally pass through a step-down regulator (not shown) before being supplied to the serviced appliance (not shown). Thus, half opened slots 95 provide an unlimited flow-limiting orifice when gas is consumed. Therefore, depending upon the shape and configuration of the nut and nipple, insert valve element 58 is adapted to be selectively displaced relative to insert body 55 between a first position (e.g. as shown in FIG. 3) at which seal 80 engages seat 72 to prevent flow through the valve, a second position (e.g. as shown in FIG. 4) at which the orifice area defined by partially uncovered slots 95 is about half of its maximum value, and a third position (e.g. as shown in FIG. 13) at which the orifice area of uncovered slots 95 is substantially at its maximum value.

Modifications

The present invention contemplates that many changes and modifications may be made. For example, the materials of construction are not deemed to be critical, and may be varied, as desired. Similarly, the particular structure of the individual component parts, of the insert, namely, the body, the valve element, the docking member, the cushion, and the like, may be changed as needed.

The male section may communicate with an appliance-to-be-fueled (e.g., a gas grill or the like). Alternatively, the male section may communicate with a source of gas such that the cylinder may be refilled through the outlet of the cylinder valve.

One unique feature of the invention is that the improved insert may be readily used with cylinder valves to incorporate the fluid-tight sealing advantages of the insert. The presence of the flow restrictor, the magnet and the orifice plate, while desirable, is optional and may be omitted if desired. Similarly, the shape and configuration of the cushion or seal 80 and the associated seat 72 may also be changed.

While the improved insert has been shown and described in the environment of a cylinder valve, it is readily apparent that the insert could be used in other types of coupling and valves as well.

Therefore, while a preferred embodiment of the improved insert has been shown and described and several modifications thereof discussed, persons skilled in this art will readily appreciate that various additional changes and modifications may be made without departing from the spirit of the invention, as defined and differentiated by the following claims.

I claim:

1. A valve insert adapted to be [removably] mounted [as a unit] on one fluid conduit to selectively enable a flow of fluid therethrough when another fluid conduit is sufficiently engaged therewith and to prevent such fluid flow when such conduits are physically separated from one another, comprising:

a tubular body adapted to be sealingly mounted on said one fluid conduit *so as to form a subassembly therewith, said subassembly having an inwardly-facing surface,* said body having an opening through which fluid may flow, having an annular seat surrounding said opening and facing toward the normal direction of fluid flow, *and* having an abutment surface facing away from the normal direction of fluid flow[, and having an inwardly-facing surface];

a valve member mounted on said body for movement relative thereto, said valve member having a resilient seal mounted for movement toward and away form said seat to define a variable-area orifice through which fluid may flow, said member being movable relative to said body to any position between one position at which said orifice area is a maximum and another position at which said orifice area is zero, said member having an abutment surface arranged to face said body abutment surface and having an outwardly-facing surface arranged to slidably engage said [body] inwardly-facing surface, the joint between said inwardly- and outwardly-facing surfaces being sealed at all relative positions between said member and body;

biasing means acting between said body and *valve* member abutment surfaces for continuously urging said seal to move toward said seat;

a docking member mounted on said *valve* member and adapted to engage said other fluid conduit; and coupling means for selectively holding said first and second conduits together with said other conduit engaged with said insert;

whereby when said conduits are separated, *a* pressure differential across said insert will act across a first area to urge said seal into tighter sealed engagement with said seat, and when said other conduit is engaged with said insert and displaces said seal off said seat, a pressure differential across said insert will act across a second area to urge said docking member into fluid-tight sealed engagement with said other conduit independent of the specific position of said member relative to said body.

2. A valve insert as set forth in claim 1 wherein said one fluid conduit is the outlet of a cylinder valve.

3. A valve insert as set forth in claim 2 wherein said insert is adapted to be removably mounted within said cylinder valve.

4. A valve insert as set forth in claim 3 wherein said cylinder valve outlet is tubular and has an internally-threaded portion, wherein said body has an externally-threaded portion adapted to matingly engage said internally-threaded portion when said insert is mounted within said outlet.

5. A valve insert as set forth in claim 3 wherein said other fluid conduit is a nipple adapted to be inserted into said outlet.

6. A valve insert as set forth in claim 1 wherein said valve member includes a cup-shaped member having a side wall and a bottom, and wherein a plurality of slots extend radially through said side wall adjacent said bottom.

7. A valve insert as set forth in claim 6 wherein said cup-shaped member is provided with an axial hole through said bottom, and further comprising a backing member having a disk-like portion and having a stub portion, and wherein said stub portion is passed through said bottom hole.

8. A valve insert as set forth in claim 7 wherein the distal end of said stub portion is deformed to form a head portion for preventing unintended separation of said backing member from said cup-shaped member.

9. A valve insert as set forth in claim 8 wherein said seal is an annular disk-like member surrounding said stub portion and arranged between said backing member and the bottom of said cup-shaped member.

10. A valve insert as set forth in claim 9 wherein said seal and backing members extend radially outwardly beyond the side wall of said cup-shaped member.

11. A valve insert as set forth in claim 1 wherein said body inwardly-facing surface is cylindrical, wherein said valve member outwardly-facing surface is cylindrical, and wherein the joint between such surfaces is sealed by an O-Ring.

12. A valve insert as set forth in claim 1 wherein said docking member has a plurality of spaced fingers, and wherein said valve member has a corresponding plurality of spaced recesses for receiving said fingers.

13. A valve insert as set forth in claim 1 wherein said body and valve member are formed of brass.

14. A valve insert as set forth in claim 1 wherein said body and valve member are formed of polyethylene terephalate.

15. A valve insert as set forth in claim 1 wherein said seal is formed of a resilient material having a hardness of about 90 ±5 durometer on a Shore "A" scale.

16. A valve insert as set forth in claim 1 wherein said docking member is formed of a resilient material having a hardness of about 70 ±5 durometer on a Shore "A" scale.

17. A valve insert as set forth in claim 1 wherein said valve member is adapted to be moved relative to said body between a first position at which the area of said orifice is zero, a second position at which the area of said orifice is intermediate zero and its maximum value, and a third position at which the area of said orifice is its maximum value.

* * * * *